(12) United States Patent
Seki et al.

(10) Patent No.: US 10,429,828 B2
(45) Date of Patent: Oct. 1, 2019

(54) PLANT SIMULATION DEVICE AND PLANT SIMULATION METHOD WITH FIRST PARAMETER ADJUSTABLE AT START AND SECOND PARAMETER ADJUSTABLE DURING OPERATION OF THE PLANT

(71) Applicant: YOKOGAWA ELECTRIC CORPORATION, Tokyo (JP)

(72) Inventors: Tatenobu Seki, Tokyo (JP); Mitsuhiro Yamamoto, Tokyo (JP); Yoshihisa Hidaka, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 15/715,753

(22) Filed: Sep. 26, 2017

(65) Prior Publication Data

US 2018/0088568 A1 Mar. 29, 2018

(30) Foreign Application Priority Data

Sep. 28, 2016 (JP) .................................. 2016-188973

(51) Int. Cl.
*G05B 13/02* (2006.01)
*G05B 19/418* (2006.01)
(Continued)

(52) U.S. Cl.
CPC ....... *G05B 19/41885* (2013.01); *G05B 17/02* (2013.01); *G05B 19/41815* (2013.01);
(Continued)

(58) Field of Classification Search
CPC .................................................... G05B 13/042
(Continued)

(56) References Cited

U.S. PATENT DOCUMENTS 6,097,989 A * 8/2000 Maki ..................... F02D 41/047
700/37
8,802,909 B2 * 8/2014 Won ........................ C07C 5/333
585/435
(Continued)

FOREIGN PATENT DOCUMENTS

JP 63239508 A * 10/1988
JP 2001051714 A * 2/2001
(Continued)

OTHER PUBLICATIONS

Ishi Kenshin, English Translation of JP2009163507, Jul. 23, 2009, pp. 12 (Year: 2009).*
(Continued)

*Primary Examiner* — Suresh Suryawanshi
(74) *Attorney, Agent, or Firm* — Osha Liang LLP

(57) ABSTRACT

A plant simulation device includes a first storage that stores a model that models a state of a facility in a plant, a first parameter that is fixed at a start operation of the plant, and a second parameter that is varied during an operation of the plant, the first parameter and the second parameter being set in the model, and a simulator that compares a process value of the facility with a simulated value calculated using the model and that adjusts the first parameter and the second parameter.

16 Claims, 8 Drawing Sheets

(51) Int. Cl.
*G05B 17/02* (2006.01)
*G05B 23/02* (2006.01)

(52) U.S. Cl.
CPC ... *G05B 19/41875* (2013.01); *G05B 23/0243* (2013.01); *G05B 19/4183* (2013.01); *G05B 19/41835* (2013.01); *Y02P 90/14* (2015.11); *Y02P 90/26* (2015.11)

(58) Field of Classification Search
USPC .......................................................... 700/28
See application file for complete search history.

(56) References Cited

U.S. PATENT DOCUMENTS

| | | | |
|---|---|---|---|
| 2005/0240382 A1 | 10/2005 | Nakaya et al. | |
| 2007/0118237 A1* | 5/2007 | Wang | G05B 17/02 700/31 |
| 2013/0116802 A1* | 5/2013 | Friman | G05B 17/02 700/30 |
| 2014/0107993 A1* | 4/2014 | Cheng | G05B 17/02 703/13 |
| 2014/0330542 A1* | 11/2014 | Subramanian | G05B 17/02 703/1 |
| 2015/0261200 A1* | 9/2015 | Blevins | G05B 17/02 700/21 |
| 2017/0261950 A1* | 9/2017 | Mori | G05B 13/042 |

FOREIGN PATENT DOCUMENTS

| | | | |
|---|---|---|---|
| JP | 2006317974 A | * | 11/2006 |
| JP | 2009015477 A | * | 1/2009 |
| JP | 2009163507 A | * | 7/2009 |
| JP | 2009163507 A | | 7/2009 |
| JP | 4524683 B2 | | 8/2010 |
| JP | 4789277 B2 | | 10/2011 |
| JP | 2013020351 A | * | 1/2013 |
| JP | 5212890 B2 | | 6/2013 |

OTHER PUBLICATIONS

Lienhard, John H. et al., "A Heat Transfer Textbook," XP055450540, Cambridge Massachusetts, U.S.A., pp. 257, 283, and 348-350, dated Jun. 27, 2001, http://www.mie.uth.gr/labs/ltte/grk/pubs/ahtt.pdf, retrieved on Feb. 13, 2018 (7 pages).

* cited by examiner

TIME-SERIES CHANGE OF REFERENCE
HEAT TRANSFER COEFFICIENT

PLANT SIMULATION DEVICE AND PLANT SIMULATION METHOD WITH FIRST PARAMETER ADJUSTABLE AT START AND SECOND PARAMETER ADJUSTABLE DURING OPERATION OF THE PLANT

FIELD OF THE INVENTION

The present invention relates to a plant simulation device and a plant simulation method. The present application claims priority based on Japanese patent application 2016-188973, filed on Sep. 28, 2016 and includes herein by reference the content thereof.

BACKGROUND

A process plant includes facilities that realize predetermined functions such as tanks, piping, pumps, compressors, and heat exchangers and a process control system that measures or controls states of the facilities and states of raw materials, gases, coolants, and the like flowing in the facilities. Recently, advancements and increases in complexity of such process plants have progressed and the number of facilities which are controlled by the process control system is increasing.

In such a process control system, a simulator for simulating behavior of a plant is often used. For example, Japanese Patent No. 4789277 discloses a simulator that adjusts (tracks) a simulation model from time to time on the basis of actual data (on-line data) of a plant and executes simulation in parallel with operation of the plant using the adjusted simulation model in order to improve calculation accuracy of the simulator. Japanese Unexamined Patent Application, First Publication No. 2009-163507 discloses a simulator that is used to diagnose facilities as well as to predict a process status (also refer to Japanese Patent No. 4524683 and Japanese Patent No. 5212890).

SUMMARY

Most of a diagnosis process using a simulator of the related art is often carried out on only specific devices, such as mechanical diagnosis such as vibration diagnosis mainly for rotary machinery or diagnosis of corrosion of an outer portion of a tank, clogging or thickness reduction of piping, or the like. There are some cases where, with only such individual facility diagnosis, occurrence of an abnormality in a whole (or partial) plant process is not detected in advance or a degree of deterioration of a facility which is not subjected to diagnosis is not understood. The duration of service of a plant is often 30 years or more, and in the meantime, plants have been temporarily stopped to carry out conservation and maintenance such as cleaning, repairing, replacement, reinforcement, and the like of facilities or instrumentation devices. However, since sufficient information on the degrees of deterioration of facilities or instrumentation devices is not collected, there are some cases where appropriate conservation and maintenance are not carried out.

In a simulator of the related art, processing of adjusting parameters varying depending on operating statuses of facilities or devices to match simulation results with actual data of a process is performed. At this time, adjustment of parameters related to construction conditions of the facilities or devices, which are set at the time of designing the plant, is not performed. However, there are some cases where the parameters related to the construction conditions of the facilities or devices vary due to an influence of deterioration with age, contamination, and the like of the plant in consideration of the long duration of service of the plant. When it is intended to adjust both a parameter varying depending on operating statuses of the facilities or devices and a parameter related to construction conditions of the facilities or devices by tracking simulation, the parameter related to the construction conditions of the facilities or devices has an influence on many other parameters. Thus, there are some cases where the simulation results do not converge, that is, the simulated values do not match the actual data. When parameter adjustment is performed with the parameter related to the construction conditions of the facilities or devices set as a fixed value, there are some cases where the parameter is adjusted due to an influence of a factor, which is not directly related to the parameter and varies depending on the operating statuses of the facilities or devices, and thus the simulation results have an error.

In adjustment of the parameter related to the construction conditions of the facilities or devices, there are some cases where maker-designed values or experimental values of the facilities or devices are used. However, such maker-provided values are often taken under conditions different from actual usage conditions of the plant. When a difference between a maker-provided value and an actual parameter value in the plant is large, there are some cases where simulation accuracy decreases.

One or more embodiments of the present invention provide a plant simulation device and a plant simulation method that can improve accuracy of a model which is used for simulation of a plant.

A plant simulation device according to one or more embodiments of the present invention may include a first storage storing a model which models a state of a facility in a plant, a first parameter which is fixed at the start operation of the plant, and a second parameter which is varied during the operation of the plant, the first parameter and the second parameter being set in the model, and a simulator configured to compare a process value of the facility with a simulated value which is calculated using the model and to adjust the first parameter and the second parameter.

The above-described plant simulation device may further include a diagnoser configured to diagnose the facility using change information of at least one of the first parameter and the second parameter which are adjusted by the simulator.

In the above-described plant simulation device, the simulator may be configured to adjust the first parameter and the second parameter to make a difference between the process value of the facility and the simulated value calculated using the model being equal to or less than a first threshold value.

In the above-described plant simulation device, the simulator may be configured to adjust the second parameter after adjusting the first parameter.

In the above-described plant simulation device, the simulator may be configured to prevent the adjustment of the second parameter if an operating status of the facility does not satisfy adjustment conditions.

The above-described plant simulation device may further include a second storage storing change information of the first parameter and the second parameter adjusted by the simulator, and operating conditions of the facility and time information at the time of adjustment.

In the above-described plant simulation device, the facility may be a heat exchanger. The first parameter may be a value indicating flow rate dependency of a heat transfer coefficient of the heat exchanger and the second parameter may be a reference heat transfer coefficient at a reference flow rate of the heat exchanger.

In the above-described plant simulation device, the facility may be a heat exchanger. The first parameter may be a value indicating flow rate dependency of a heat transfer coefficient of the heat exchanger and the second parameter may be a reference heat transfer coefficient at a reference flow rate of the heat exchanger. The diagnoser may be configured to generate time-series data of the reference heat transfer coefficient and to diagnose the heat exchanger based on the generated time-series data.

In the above-described plant simulation device, the simulator may be configured to prevent the adjustment of the reference heat transfer coefficient if the flow rate of the heat exchanger is less than a second threshold value.

In the above-described plant simulation device, the simulator may be configured to adjust the second parameter using the first parameter adjusted.

A plant simulation method according to one or more embodiments of the present invention may include comparing a simulated value which is calculated using a model modeling a state of a facility in a plant with a process value of the facility, and adjusting a first parameter which is fixed at the start of operation of the plant and a second parameter which is varied during the operation of the plant, the first parameter and the second parameter being set in the model.

The above-described plant simulation method may further include diagnosing the facility using change information of at least one of the first parameter and the second parameter which are adjusted.

In the above-described plant simulation method, the adjustment of the first parameter and the second parameter may be performed to make a difference between the process value of the facility and the simulated value calculated using the model being equal to or less than a first threshold value.

In the above-described plant simulation method, the adjustment of the second parameter may be performed after the adjustment of the first parameter.

In the above-described plant simulation method, the adjustment of the second parameter may be prevented if an operating status of the facility does not satisfy adjustment conditions.

In the above-described plant simulation method may further include storing change information of the first parameter and the second parameter adjusted, and operating conditions of the facility and time information at the time of adjustment.

In the above-described plant simulation method, the facility may be a heat exchanger. The first parameter may be a value indicating flow rate dependency of a heat transfer coefficient of the heat exchanger and the second parameter may be a reference heat transfer coefficient at a reference flow rate of the heat exchanger.

In the above-described plant simulation method, the facility may be a heat exchanger. The first parameter may be a value indicating flow rate dependency of a heat transfer coefficient of the heat exchanger and the second parameter may be a reference heat transfer coefficient at a reference flow rate of the heat exchanger. The method may further include generating time-series data of the reference heat transfer coefficient. The diagnosis of the heat exchanger may be performed based on the generated time-series data.

In the above-described plant simulation method, the adjustment of the reference heat transfer coefficient may be prevented if the flow rate of the heat exchanger is less than a second threshold value.

In the above-described plant simulation method, the adjustment of the second parameter may be performed using the first parameter adjusted.

The plant simulation device and the plant simulation method according to one or more embodiments of the present invention can improve accuracy of a model which is used for simulation of a plant.

DETAILED DESCRIPTION

Hereinafter, plant simulation devices and plant simulation methods according to one or more embodiments of the present invention will be described with reference to the accompanying drawings.

Figure 1:
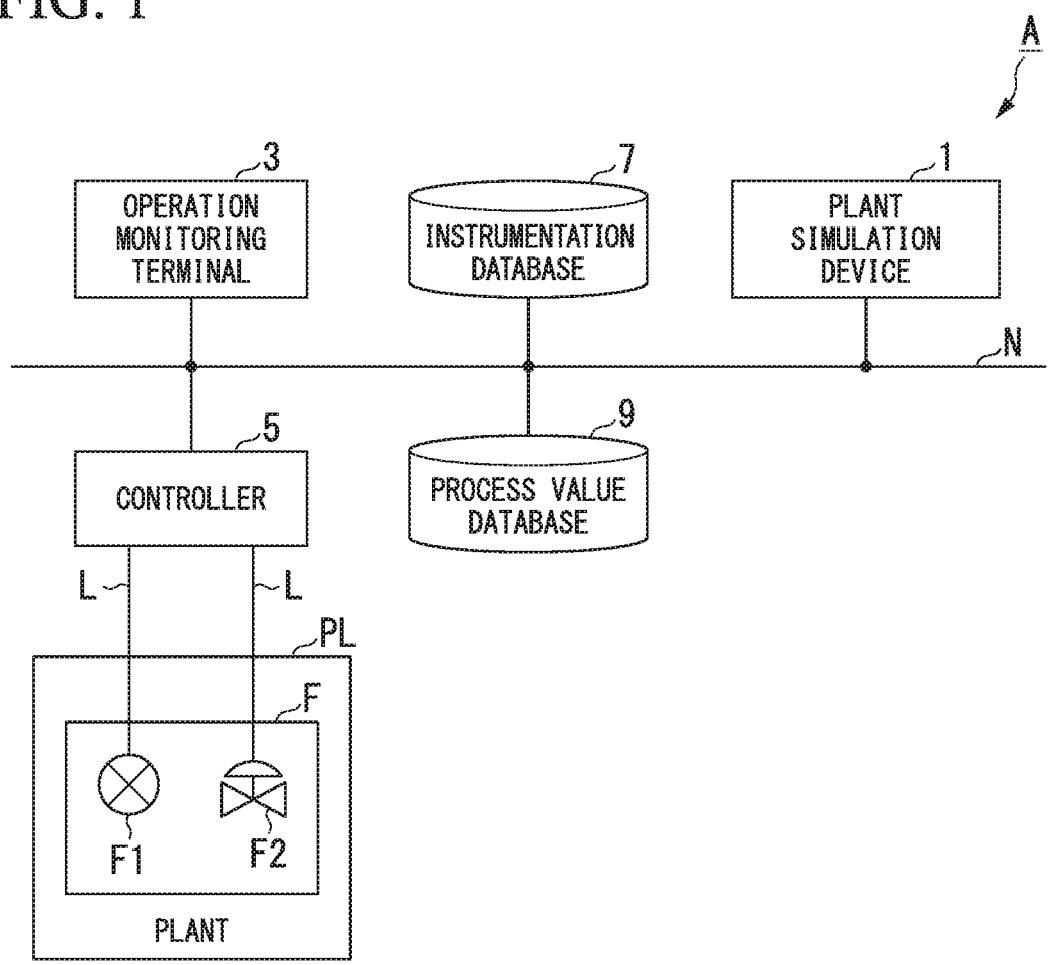
FIG. 1 is a block diagram showing an example of a plant simulation system including a plant simulation device according to one or more embodiments of the present invention.

FIG. 1 is a block diagram showing an example of a plant simulation system A including a plant simulation device 1 according to one or more embodiments of the present invention. The plant simulation device 1 performs diagnosis of facilities provided in a plant PL which is a diagnosis target. This diagnosis of facilities includes diagnosis of instruments, devices, and process units included in the facilities. The plant simulation device 1 is connected to, for example, an operation monitoring terminal 3, a controller 5, an instrumentation database 7, and a process value database 9 via a control network N.

The plant simulation device 1 compares actual data (process values) which are acquired from facilities provided in the plant PL with simulated values which are acquired by simulation and adjusts parameters which are set in a model used for the simulation. The plant simulation device 1 diagnoses the facilities provided in the plant PL, for example, estimates performance deterioration thereof. Details of the plant simulation device 1 will be described later.

Figure 2:
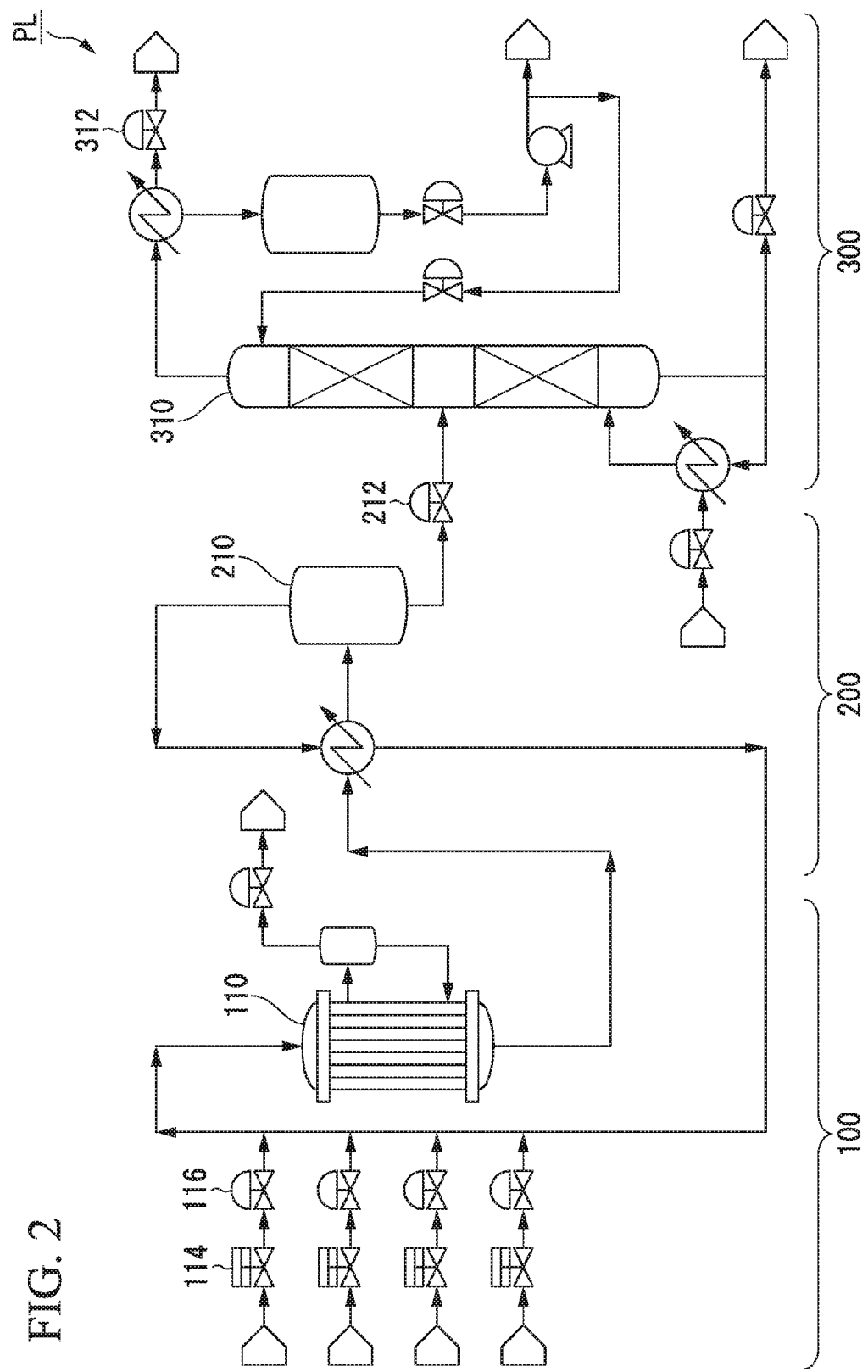
FIG. 2 is a diagram showing an example of a plant according to one or more embodiments of the present invention.

Examples of the plant PL include an industrial plant such as a chemical plant, a plant that manages and controls a well site such as a gas field or an oil field or peripheries thereof, a plant that manages and controls power generation such as hydraulic power generation, thermal power generation, or atomic power generation, a plant that manages and controls environmental power generation such as photovoltaic power generation or wind power generation, and a plant that manages and controls water supply and sewerage, a dam, or the like. FIG. 2 is a diagram showing an example of the plant according to one or more embodiments of the present invention. The plant PL shown in FIG. 2 is a chemical plant including a plurality of process units, that is, a reactor unit 100, a gas-liquid separator unit 200, and a distillation column unit 300. The reactor unit 100 is supplied with raw materials of products from the outside of the plant PL and carries out chemical reactions required for manufacturing products using the supplied raw materials. Various field devices (for example, various valves 114 and 116 and various sensors (not shown)) are provided in the reactor unit 100 in addition to a reactor 110 that carries out the chemical reactions.

The gas-liquid separator unit 200 is disposed downstream from the reactor unit 100 and separates gas components and liquid components included in products acquired through the chemical reactions in the reactor unit 100. Various field devices (for example, various valves 214 and various sensors (not shown)) are provided in the gas-liquid separator unit 200 in addition to a separator 210 that performs the separation processing. The distillation column unit 300 is disposed downstream from the gas-liquid separator unit 200 and separates and condenses components having different boiling points, which are included in a liquid component, by distilling and then condensing the liquid component separated by the gas-liquid separator unit 200. The distillation column unit 300 supplies gas and liquid components produced by the plant PL to another plant. Various field devices (for example, various valves 312 and various sensors (not shown)) are provided in the distillation column unit 300 in addition to a distillation column 310 that performs the distillation processing.

In FIG. 1, the plant PL shown in FIG. 2 is simplified and only a field device F included in the process units is shown. The field device F is connected to the controller 5 via a transmission line L. The field device F transmits a signal such as measured process values (for example, a flow rate and a temperature) to the controller 5 via the transmission line L. The field device F includes, for example, a measuring device F1 such as a flowmeter or a temperature sensor and an actuator F2 such as a valve. Two field devices are shown in FIG. 1, but three or more field devices may be disposed in the plant PL.

The operation monitoring terminal 3 is operated by, for example, operators of the plant and is used to monitor a process. For example, the operation monitoring terminal 3 acquires from the controller 5 data (for example, process values) transmitted from the field device F, transmits behavior of the field device F or the controller 5 to the operators, and controls the controller 5 on the basis of instructions from the operators.

The controller 5 performs process control communication with the field device F in accordance with instructions from the operation monitoring terminal 3 or the like to control the field device F. For example, the controller 5 acquires process values measured by a certain field device F (for example, the measuring device F1) and calculates and transmits an amount of operation of another field device F (for example, the operating device F2) to control another field device F. The controller 5 stores the process values, which are acquired by the process control communication with the field device F, into the process value database 9.

The instrumentation database 7 stores conditions of the facilities provided in the plant PL or the like. In a plant life cycle which is a long period of time, there are some cases where a facility is replaced or added or a control program is modified. The instrumentation database 7 also stores change history information thereof.

The process value database 9 stores data transmitted from the field device F or data (for example, the process values, the amount of operation, and operating conditions) transmitted to the field device F. The instrumentation database 7 and the process value database 9 may be included in a memory disposed in the controller 5. Alternatively, the instrumentation database 7 and the process value database 9 may be included in a memory disposed in the plant simulation device 1.

The control network N is a wired network such as Ethernet (registered trademark), but may be a wireless network enabling wireless communication based on wireless communication standards such as Wi-Fi (registered trademark), WiMAX (registered trademark), and 3G/LTE (registered trademark).

Figure 3:
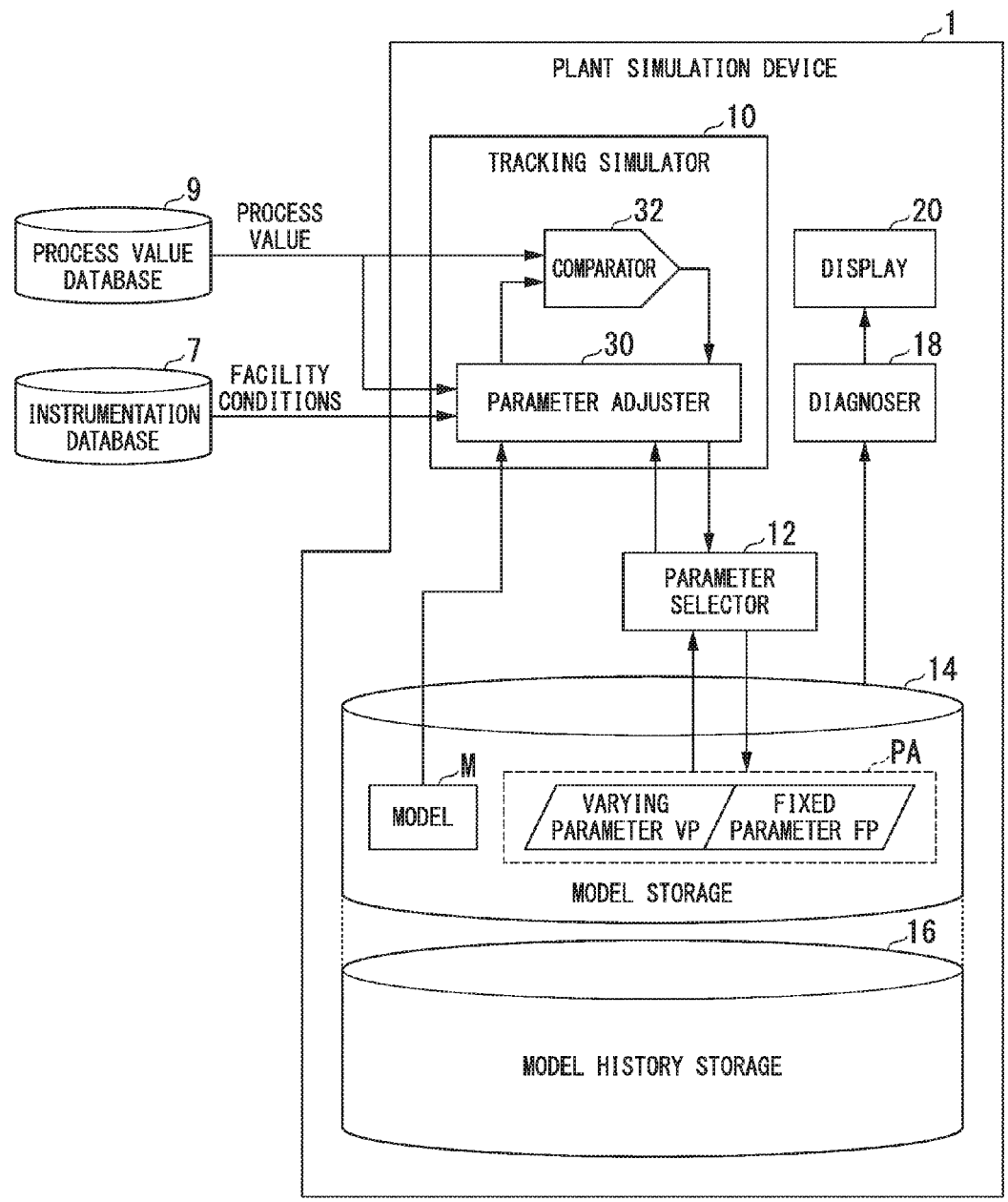
FIG. 3 is a block diagram showing an example of the plant simulation device according to one or more embodiments of the present invention.

FIG. 3 is a block diagram showing an example of the plant simulation device 1 according to one or more embodiments of the present invention. The plant simulation device 1 includes, for example, a tracking simulator 10 (a simulator), a parameter selector 12, a model storage 14 (a first storage), a model history storage 16 (a second storage), a diagnoser 18, and a display 20. The tracking simulator 10, the parameter selector 12, and the diagnoser 18 may be embodied, for example, by causing a processor such as a central processing unit (CPU) to execute a program stored in a program memory which is not shown.

The tracking simulator 10 tracks an actual plant on-line in real time and simulates a state of the plant. Since a rigorous model based on chemical engineering is used, the tracking simulator 10 can calculate a detailed state in the process as well as simple superficial behavior such as an input into and an output from the process. Accordingly, deterioration in the plant is also reflected in parameters of the simulation. For example, the tracking simulator 10 has a function of adjusting a model M which is used for the simulation and matching the model with actual behavior of the plant PL by reading various data such as process values from the process value database 9, simulating operating statuses of the facilities provided in the plant PL, and comparing the simulation results with actual data of the process values.

The model M models states of the facilities such as process units, devices, and instruments provided in the plant PL. The model M is prepared on the basis of piping and instruments diagrams (P&ID) and the like at the time of design of the plant. The model M is expressed by simultaneous equations representing relationships between an input, an output, external factors, and various parameters included in the facilities to be modeled.

For example, the tracking simulator 10 performs the tracking simulation by adjusting parameters PA which are set in the model M. Examples of the parameters PA to be adjusted include a "fixed parameter FP (a first parameter)" and a "varying parameter VP (a second parameter)."

The "fixed parameter FP" is a parameter which is adjusted and fixed under actual operating conditions of the facilities, for example, in a trial operation phase such as introduction or periodic maintenance of the plant, that is, when the plant is started to be operated. The fixed parameter FP varies depending on construction conditions of each facility such as initial performance, deterioration states, and degrees of contamination of each facility. The fixed parameter FP is not changed or adjusted during normal operation of the plant. The fixed parameter FP is set for each facility, for example, for each process unit, each instrument, and each device. For example, when a facility to be diagnosed is a heat exchanger, the fixed parameter FP is a value (a proportional index) indicating flow rate dependency of a heat transfer coefficient of the heat exchanger.

The "varying parameter VP" is a parameter which is adjusted and varied, for example, in a normal operation phase of the plant, that is, under actual operating conditions of the facilities during the operation of the plant. The varying parameter VP varies depending on operating statuses of each facility. The varying parameter VP is set for each facility, for example, for each process unit, each instrument, and each device. For example, when a facility to be diagnosed is a heat exchanger, the varying parameter VP is a reference heat transfer coefficient of the heat exchanger, for example, a designed heat transfer coefficient.

The tracking simulator 10 includes, for example, a parameter adjuster 30 and a comparator 32. The parameter adjuster 30 performs tracking simulation using the model M read from the model storage 14 and the parameter PA input from the parameter selector 12. The comparator 32 compares a simulated value calculated by the parameter adjuster 30 with a process value acquired from the process value database 9 and inputs the comparison result into the parameter adjuster 30. The parameter adjuster 30 performs processing (tracking simulation) of adjusting the parameter PA to match an actual operation of the plant PL on the basis of the comparison result input from the comparator 32. For example, the tracking simulator 10 adjusts the fixed parameter FP and the varying parameter VP such that a difference between the process value of the facility and the simulated value calculated using the model M is equal to or less than a predetermined threshold value (a difference threshold value, a first threshold value). The tracking simulator 10 performs adjustment of the fixed parameter FP and adjustment of the varying parameter VP at different times.

The parameter selector 12 selects a parameter to be adjusted among the varying parameter VP and the fixed parameter FP on the basis of an instruction of an operator of the plant such as an instruction to adjust the fixed parameter FP and an instruction to adjust the varying parameter VP input from the operation monitoring terminal 3, and reads the selected parameter from the model storage 14. Then, the parameter selector 12 inputs at least one of the read varying parameter VP and the read fixed parameter FP into the parameter adjuster 30.

The model storage 14 stores the model M which is used for simulation of the parameter adjuster 30 and the parameters PA (the varying parameter VP and the fixed parameter FP). The model history storage 16 stores a change history of the parameters PA which have been adjusted by the parameter adjuster 30 along with operating conditions of the facilities at the time of adjustment or time stamps (time information). The model storage 14 and the model history storage 16 are constituted, for example, by a hard disk drive (HDD), a solid state drive (SSD), or a memory. The model storage 14 and the model history storage 16 may be in the same hardware.

The diagnoser 18 diagnoses states of each facility provided in the plant PL by comparing parameter values adjusted in previous simulations and parameter values adjusted in the current simulation. The diagnoser 18 inputs diagnosis results of the facilities into the display 20. For example, the diagnoser 18 diagnoses the facilities using the change information of the varying parameter VP adjusted by the tracking simulator 10. The diagnoser 18 may be provided in the operation monitoring terminal 3.

The display 20 displays diagnosis results of the facilities input from the diagnoser 18. The display 20 includes, for example, a liquid crystal display or an organic electroluminescence (EL) display.

(Adjustment of Fixed Parameter)

Figure 4:
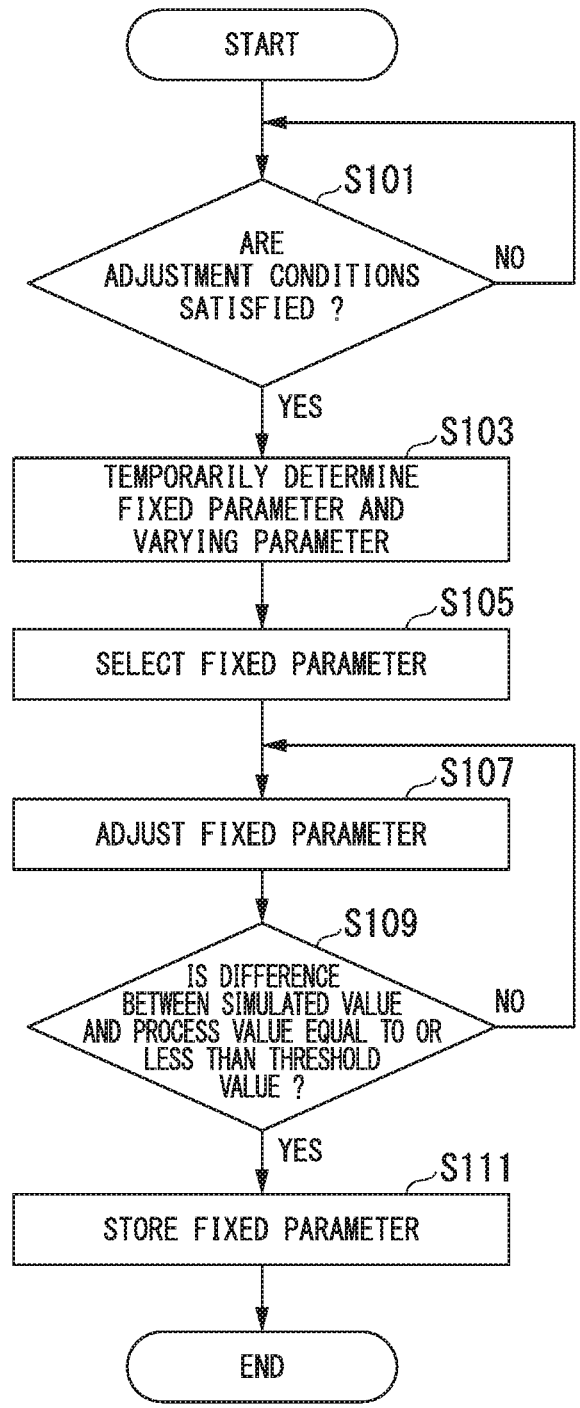
FIG. 4 is a flowchart showing an example of a fixed parameter adjusting process of the plant simulation device according to one or more embodiments of the present invention.

Operations of the plant simulation device 1 according to one or more embodiments of the present invention will be described below. FIG. 4 is a flowchart showing an example of a fixed parameter adjusting process in the plant simulation device 1 according to one or more embodiments of the present invention.

For example, in a trial operation phase such as introduction or periodic maintenance of the plant PL, when an operator of the plant instructs to adjust the fixed parameter FP by operating the operation monitoring terminal 3, the parameter adjuster 30 determines whether adjustment conditions of the fixed parameter FP are satisfied using the process values (for example, a flow rate) read from the process value database 9 (Step S101). When the parameter adjuster 30 determines that the adjustment conditions of the fixed parameter FP are not satisfied, the parameter adjuster 30 repeatedly performs the determination process using the process values.

On the other hand, when the parameter adjuster 30 determines that the adjustment conditions of the fixed parameter FP are satisfied, the parameter adjuster 30 stores, into the model storage 14, a temporarily determined value of the fixed parameter FP (for example, a value determined by the operator) input by the operator of the plant using the operation monitoring terminal 3 and a designed value of the varying parameter VP (for example, a maker-provided value) as initial values, and temporarily determines the fixed parameter FP and the varying parameter VP (Step S103).

Then, the parameter selector 12 selects the fixed parameter FP as a parameter to be adjusted and does not select the varying parameter VP, and inputs an instruction to start the tracking simulation to the parameter adjuster 30 (Step S105).

Then, the parameter adjuster 30 starts the tracking simulation using the fixed parameter FP as the parameter to be adjusted and adjusts the fixed parameter FP (Step S107).

Then, the parameter adjuster 30 inputs into the comparator 32 a simulated value calculated by the simulation using the fixed parameter FP as the parameter to be adjusted. The comparator 32 compares the process value read from the process value database 9 with the simulated value input from the parameter adjuster 30 and outputs the comparison result to the parameter adjuster 30. The parameter adjuster 30 determines whether a difference between the simulated value and the process value is equal to or less than a predetermined difference threshold value (a first difference threshold value) with reference to the comparison result (Step S109). When the parameter adjuster 30 determines that the difference between the simulated value and the process value is not equal to or less than the predetermined first difference threshold value, the parameter adjuster 30 adjusts the fixed parameter FP again. The parameter adjuster 30 may repeatedly adjust the parameter until the simulated value and the process value match each other.

On the other hand, when the parameter adjuster 30 determines that the difference between the simulated value and the process value is equal to or less than the predetermined first difference threshold value, the parameter adjuster 30 inputs the adjusted fixed parameter FP into the parameter selector 12. The parameter selector 12 stores the fixed parameter FP input from the parameter adjuster 30 in the model storage 14 (Step S111), and ends the routine of this flowchart. The parameter adjuster 30 may store the adjusted fixed parameter FP in the model storage 14. If necessary, the operator of the plant may manually adjust the fixed parameter.

(Adjustment of Varying Parameter)

Figure 5:
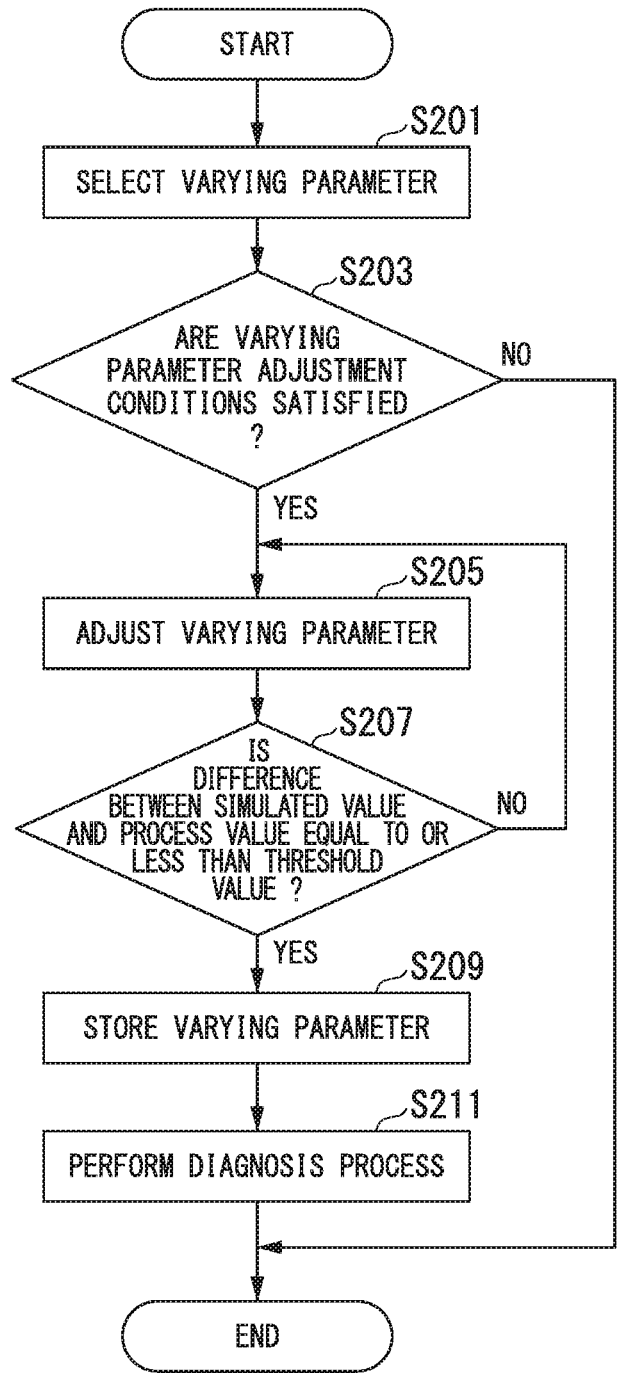
FIG. 5 is a flowchart showing an example of a varying parameter adjusting process of the plant simulation device according to one or more embodiments of the present invention.

FIG. 5 is a flowchart showing an example of a varying parameter adjusting process in the plant simulation device 1 according to one or more embodiments of the present invention.

For example, in a normal operation phase of the plant PL, when an operator of the plant instructs to adjust the varying parameter VP by operating the operation monitoring terminal 3, the parameter selector 12 reads the varying parameter VP and the fixed parameter FP from the model storage 14 and selects the varying parameter VP as a parameter to be adjusted and does not select the fixed parameter FP (Step S201). That is, after the fixed parameter FP is adjusted in the trial operation phase of the plant PL as described above, the varying parameter VP is adjusted in this routine. The parameter selector 12 inputs the varying parameter VP selected as the parameter to be adjusted and the fixed parameter FP into the parameter adjuster 30 of the tracking simulator 10.

Then, the parameter adjuster 30 determines whether an operating status of the facility to be diagnosed satisfies predetermined varying parameter adjustment conditions (Step S203). For example, when tracking simulation is performed under conditions in which the operating status of the facility to be diagnosed is not stabilized, for example, a condition in which the operating status is out of a normal operation range or a condition in which a change with respect to time is great, there are some cases where the varying parameter VP is not appropriately performed. Accordingly, when the parameter adjuster 30 determines that the operating status of the facility to be diagnosed does not satisfy the predetermined varying parameter adjustment conditions, the parameter adjuster 30 does not perform adjustment of the varying parameter VP, that is, the parameter adjuster 30 prevents the adjustment of the varying parameter VP, but ends the routine of this flowchart. The parameter adjuster 30 performs the determination process, for example, on the basis of the process value read from the process value database 9. When the adjustment of the varying parameter VP is not performed as described above, the diagnoser 18 or the operation monitoring terminal 3 may be notified that the adjustment of the varying parameter VP is not completed.

On the other hand, when the parameter adjuster 30 determines that the operating status of the facility to be diagnosed satisfies the predetermined varying parameter adjustment conditions, the parameter adjuster 30 starts tracking simulation using the varying parameter VP and the fixed parameter FP input from the parameter selector 12, the model M read from the model storage 14, the process value read from the process value database 9, and facility conditions read from the instrumentation database 7, and adjusts the varying parameter VP (Step S205).

Then, the parameter adjuster 30 inputs the simulated value calculated by the tracking simulation into the comparator 32. The comparator 32 compares the process value read from the process value database 9 with the simulated value input from the parameter adjuster 30, and inputs the comparison result into the parameter adjuster 30. The parameter adjuster 30 determines whether a difference between the simulated value and the process value is equal to or less than a predetermined difference threshold value (a second difference threshold value) with reference to the comparison result (Step S207). When the parameter adjuster 30 determines that the difference between the simulated value and the process value is not equal to or less than the predetermined second difference threshold value, the parameter adjuster 30 performs adjustment of the varying parameter VP again. The second difference threshold value may be equal to the first difference threshold value or may be different from the first difference threshold value. For example, the second difference threshold value may be less than the first difference threshold value.

On the other hand, when the parameter adjuster 30 determines that the difference between the simulated value and the process value is equal to or less than the predetermined second difference threshold value, the parameter adjuster 30 inputs the adjusted varying parameter VP into the parameter selector 12. The parameter selector 12 stores the adjusted varying parameter VP input from the parameter adjuster 30 into the model storage 14 (Step S209). The parameter selector 12 stores the adjusted parameter along with the conditions or time stamps at the time of adjustment of the parameter into the model history storage 16. The parameter selector 12 may store all parameters in the model storage 14 and the model history storage 16 every time adjustment of the parameter is completed, or may store the parameter adjusted at an arbitrary time in the model storage 14 and the model history storage 16.

Then, the diagnoser 18 reads the varying parameter VP and the conditions or time stamps at the time of adjustment of the parameter from the model history storage 16 and performs a diagnosis process (Step S211). For example, the diagnoser 18 generates time-series data of the varying parameter VP and inputs the generated time-series data into the display 20. An operator of the plant can confirm the state of the facility to be diagnosed by checking the time-series data of the varying parameter VP displayed on the display 20. The routine of this flowchart ends as described above. The diagnoser 18 does not need to perform the diagnosis process whenever the varying parameter VP is stored in the model storage 14 and the model history storage 16, and may perform the diagnosis process at an arbitrary time.

According to the above-mentioned embodiment, since only the varying parameter VP is adjusted after adjustment of the value of the fixed parameter FP under the construction conditions of the facility to be diagnosed has been completed, it is possible to enhance accuracy of the model M which is used for simulation. As a result, it is possible to improve accuracy of the diagnosis result such as a prediction result and to reduce a burden of an operator during operation of the plant such as continuous presence during operation. By storing the change history of the parameter along with the operating conditions of the facilities or time stamps at the time of adjustment in the model history storage 16, it is possible to understand time-series changes of the degrees of deterioration or contamination of the facilities and to achieve improvement in conservation and maintenance efficiency.

Even when differences between measurement conditions of maker-provided values of the facilities and the actual use conditions of the plant are great, it is possible to prevent erroneous adjustment of the parameters at the time of simulation and to perform simulation with high accuracy. It is also possible to provide a model with higher accuracy at the time of periodic maintenance or modification of the plant or the like and to utilize the model over a long life cycle of the plant. Even when the maker-provided value of the facility, which is a value under a condition different from an actual use condition, is set at the time of initial setting of the fixed parameter FP, it is adjusted to a parameter value closer to an actual value at the time of adjustment of the fixed parameter FP and it is thus possible to perform adjustment with higher accuracy at the time of adjustment of the varying parameter VP.

The above embodiment describes a configuration in which the diagnoser 18 performs diagnosis using the varying parameter VP, but the diagnoser 18 may perform the facility diagnosis using the change information of the fixed parameter FP over a long period of time.

Another example will be described below. An example in which the plant simulation device according to one or more embodiments of the present invention performs simulation of a "heat exchanger" disposed in the plant will be described. Accordingly, in description of this example, the same elements as in the aforementioned embodiments will be referenced by the same reference signs and description thereof will be omitted or made in brief.

In the present example, "heat exchanger" refers to a device in which fluids having different temperatures come in contact with each other to exchange heat therebetween. In general, an amount of heat exchanged in the heat exchanger can be expressed by Equation (1).

$$Q = U \times A \times \Delta T \quad (1)$$

Wherein, Q: amount of heat exchanged
U: heat transfer coefficient with a heat transfer wall
A: area of a heat exchange portion
$\Delta T$: input/output temperature difference The heat transfer coefficient U can be expressed by Equation (2).

$$U = U_{des} \times (F \cdot mw / Fw_{des})^\alpha \quad (2)$$

Wherein, $U_{des}$: reference heat transfer coefficient, for example, designed heat transfer coefficient
F: flow rate of a fluid
mw: average molecular weight of a fluid
$Fw_{des}$: reference flow rate, for example, designed flow rate
$\alpha$: proportional index When a piping in the heat exchanger is contaminated by attachments, thermal efficiency decreases and additional fuel is required and energy costs increase. As expressed by Equation (1), since such contamination of a heat exchange surface serves as thermal resistance that decreases transmittance of heat (the heat transfer coefficient U), performance of the heat exchanger (the amount of heat exchanged Q) decreases. As expressed by Equation (2), the heat transfer coefficient U varies depending on the flow rate F of the heat exchanger. An influence of the flow rate F on the heat transfer coefficient U depends on the proportional index $\alpha$. That is, the proportional index $\alpha$ is a value indicating flow rate dependency of the heat transfer coefficient U of the heat exchanger. In one or more embodiments of the present invention, both parameters are adjusted using the proportional index $\alpha$ as a fixed parameter FP and using the reference heat transfer coefficient $U_{des}$ as a varying parameter VP, which are not considered in simulation of the related art (for example, Patent Document 2).

Figure 6:
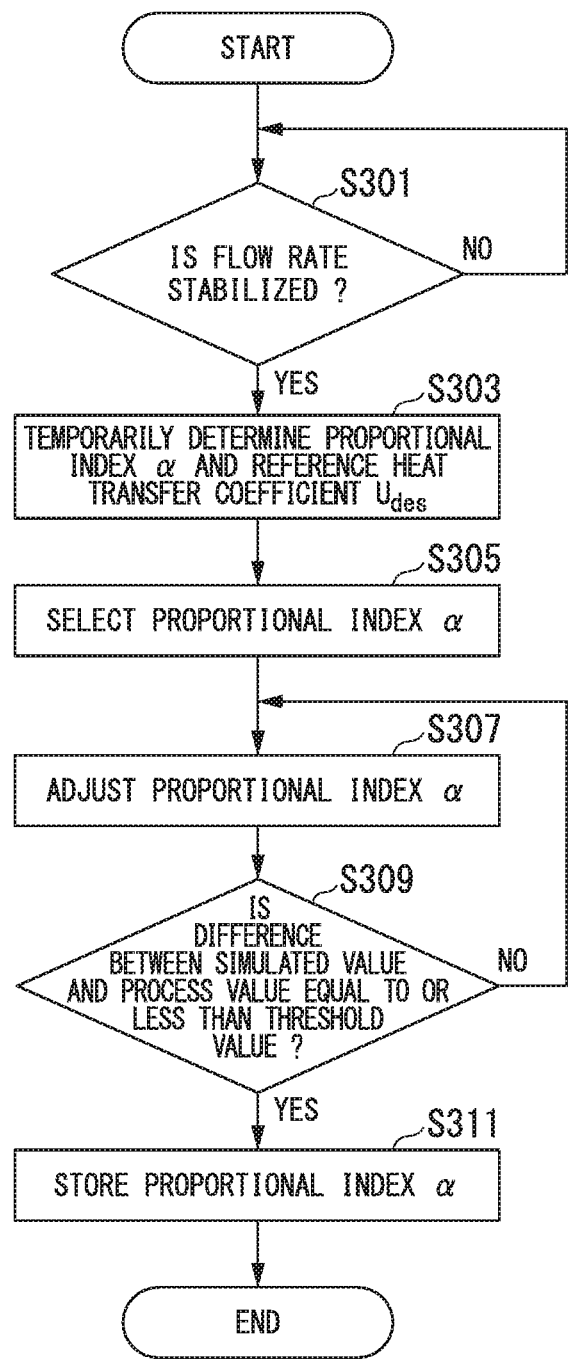
FIG. 6 is a flowchart showing an example of a process of adjusting a proportional index of a heat exchanger using a plant simulation device according to one or more embodiments of the present invention.

(Adjustment of Fixed Parameter (Proportional Index))
Operations of the plant simulation device 1 according to one or more embodiments of the present invention will be described below. FIG. 6 is a flowchart showing an example of a process of adjusting a proportional index of a heat exchanger in the plant simulation device 1 according to one or more embodiments of the present invention.

For example, in a trial operation phase such as introduction or periodic maintenance of the plant PL, when an operator of the plant instructs to adjust the fixed parameter FP by operating the operation monitoring terminal 3, the parameter adjuster 30 determines whether the flow rate F of the heat exchanger is stabilized using the process values, for example, the flow rate F read from the process value database 9 (Step S301). The determination of whether the flow rate F of the heat exchanger is stabilized is performed, for example, on the basis of whether a change of the flow rate with reference to time is equal to or less than a predetermined threshold value. When the parameter adjuster 30 determines that the flow rate F of the heat exchanger is not stabilized, the parameter adjuster 30 repeatedly performs the determination process using the flow rate F.

On the other hand, when the parameter adjuster 30 determines that the flow rate F of the heat exchanger is stabilized, the parameter adjuster 30 stores, in the model storage 14, a temporarily determined value of the fixed parameter FP (the proportional index $\alpha$), for example, a value determined by the operator, input by the operator of the plant using the operation monitoring terminal 3 and a designed value of the varying parameter VP (the reference heat transfer coefficient $U_{des}$), for example, a maker-provided value, as initial values, and temporarily determines the proportional index $\alpha$ and the reference heat transfer coefficient $U_{des}$ (Step S303).

Then, the parameter selector 12 selects the proportional index $\alpha$ as a parameter to be adjusted and does not select the reference heat transfer coefficient $U_{des}$, and inputs an instruction to start the tracking simulation into the parameter adjuster 30 (Step S305). In general, when the proportional index $\alpha$ is adjusted, the designed value, that is, the maker-provided value is used as the reference heat transfer coefficient $U_{des}$. Accordingly, adjustment of the proportional index $\alpha$ is performed in a state in which the heat exchanger is not contaminated, for example, at the time of newly starting operation of the heat exchanger or immediately after maintenance.

Then, the parameter adjuster 30 starts the tracking simulation using the proportional index $\alpha$ as the parameter to be adjusted and adjusts the proportional index $\alpha$ (Step S307).

Then, the parameter adjuster 30 inputs a simulated value calculated by the simulation using the proportional index $\alpha$ as the parameter to be adjusted to the comparator 32. The comparator 32 compares the process value read from the process value database 9 with the simulated value input from the parameter adjuster 30 and inputs the comparison result into the parameter adjuster 30. The parameter adjuster 30 determines whether a difference between the simulated value and the process value is equal to or less than a predetermined difference threshold value (a first difference threshold value) with reference to the comparison result (Step S309). When the parameter adjuster 30 determines that the difference between the simulated value and the process value is not equal to or less than the predetermined first difference threshold value, the parameter adjuster 30 adjusts the proportional index $\alpha$ again. The parameter adjuster 30 may repeatedly adjust the parameter until the simulated value and the process value match each other.

On the other hand, when the parameter adjuster 30 determines that the difference between the simulated value and the process value is equal to or less than the predetermined first difference threshold value, the parameter adjuster 30 inputs the adjusted proportional index α into the parameter selector 12. The parameter selector 12 stores the proportional index α input from the parameter adjuster 30 into the model storage 14 (Step S311), and ends the routine of this flowchart. The parameter adjuster 30 may store the adjusted proportional index α in the model storage 14. If necessary, the operator of the plant may manually adjust the proportional index α. (Adjustment of varying parameter (reference heat transfer coefficient $U_{des}$))

Figure 7:
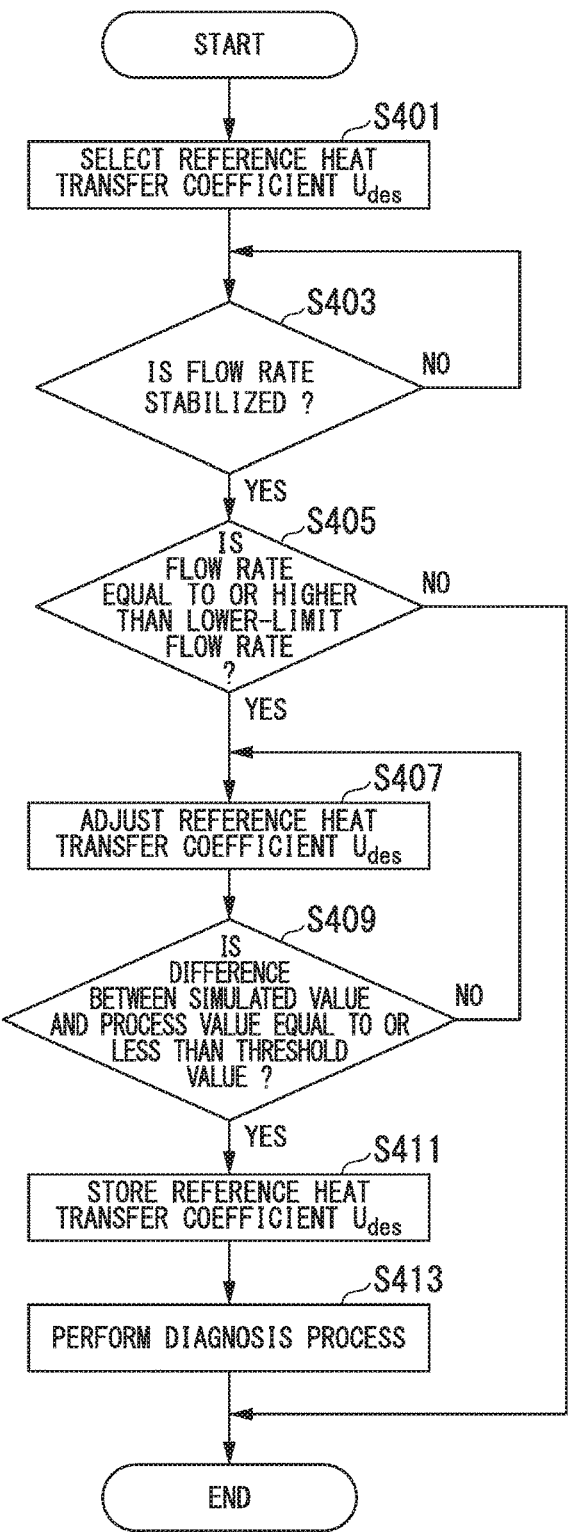
FIG. 7 is a flowchart showing an example of a process of adjusting a reference heat transfer coefficient of a heat exchanger using the plant simulation device according to one or more embodiments of the present invention.

FIG. 7 is a flowchart showing an example of a process of adjusting a reference heat transfer coefficient in the plant simulation device 1 according to one or more embodiments of the present invention.

For example, in a normal operation phase of the plant PL, when an operator of the plant instructs to adjust the reference heat transfer coefficient $U_{des}$ by operating the operation monitoring terminal 3, the parameter selector 12 reads the reference heat transfer coefficient $U_{des}$ and the proportional index α from the model storage 14 and selects the reference heat transfer coefficient $U_{des}$ as a parameter to be adjusted and does not select the proportional index α (Step S401). The parameter selector 12 inputs the reference heat transfer coefficient $U_{des}$ selected as the parameter to be adjusted and the proportional index α into the parameter adjuster 30 of the tracking simulator 10.

Then, the parameter adjuster 30 determines whether the flow rate F of the heat exchanger is stabilized with reference to the process values (for example, a flow rate F) read from the process value database 9 (Step S403). The determination of whether the flow rate F of the heat exchanger is stabilized is performed, for example, on the basis of whether a change of the flow rate F with reference to time is equal to or less than a predetermined threshold value. When the parameter adjuster 30 determines that the flow rate F of the heat exchanger is not stabilized, the parameter adjuster 30 repeatedly performs the determination process using the flow rate F. When the flow rate F of the heat exchanger is not stored in the process value database 9, that is, there is no value measured by a flow meter, the value of the flow rate F may be estimated in the tracking simulator 10.

On the other hand, when the parameter adjuster 30 determines that the flow rate F of the heat exchanger is stabilized, the parameter adjuster 30 determines whether the flow rate F of the heat exchanger is equal to or greater than a predetermined lower-limit flow rate (a flow rate threshold value) (Step S405). The tracking simulation of the parameter adjuster 30 is based on the assumption that a fluid flowing in the heat exchanger is a "turbulent flow" which is a normal flow state, but there is a likelihood that when the flow rate F of the heat exchanger is small, the flow property will be changed to a "laminar flow." In the fluid of such a laminar flow, there are some cases where Equation (2) is not established. Accordingly, when the tracking simulation is carried out on the fluid of the laminar flow, there are some cases where adjustment of the reference heat transfer coefficient $U_{des}$ is not appropriately performed. Accordingly, when the parameter adjuster 30 determines that the flow rate F of the heat exchanger is not equal to or greater than the predetermined lower-limit flow rate, that is, the flow rate F is less than the predetermined lower-limit flow rate, the parameter adjuster 30 does not perform adjustment of the reference heat transfer coefficient $U_{des}$ but ends the routine of this flowchart. The boundary between the laminar flow and the turbulent flow depends on a flow speed or an inner diameter of a pipe. For example, the lower-limit flow rate may be set to about 30% of a maximum flow rate.

On the other hand, when the parameter adjuster 30 determines that the flow rate F of the heat exchanger is equal to or greater than the predetermined lower-limit flow rate, the parameter adjuster 30 starts the tracking simulation using the reference heat transfer coefficient $U_{des}$ and the proportional index α input from the parameter selector 12, the model M read from the model storage 14, the process value read from the process value database 9, and the facility conditions read from the instrumentation database 7, and adjusts the reference heat transfer coefficient $U_{des}$ (Step S407).

Then, the parameter adjuster 30 inputs a simulated value calculated by the tracking simulation into the comparator 32. The comparator 32 compares the process value read from the process value database 9 with the simulated value input from the parameter adjuster 30 and inputs the comparison result into the parameter adjuster 30. For example, the comparator 32 compares the simulated value and the process value with respect to an outlet-side temperature of a main flow of the process of the heat exchanger or an outlet-side temperature of a coolant. An index to be compared differs depending on the type or the installation place of the heat exchanger. The parameter adjuster 30 determines whether a difference between the simulated value and the process value is equal to or less than a predetermined difference threshold value (a second difference threshold value) with reference to the comparison result (Step S409). When the parameter adjuster 30 determines that the difference between the simulated value and the process value is not equal to or less than the predetermined second difference threshold value, the parameter adjuster 30 adjusts the reference heat transfer coefficient $U_{des}$ again. The second difference threshold value may be equal to the first difference threshold value or may be different from the first difference threshold value. For example, the second difference threshold value may be less than the first difference threshold value.

On the other hand, when the parameter adjuster 30 determines that the difference between the simulated value and the process value is equal to or less than the predetermined second difference threshold value, the parameter adjuster 30 inputs the adjusted reference heat transfer coefficient $U_{des}$ into the parameter selector 12. The parameter selector 12 stores the adjusted reference heat transfer coefficient $U_{des}$ input from the parameter adjuster 30 into the model storage 14 (Step S411). The parameter selector 12 stores the adjusted parameter along with the conditions or time stamps at the time of adjustment of the parameter into the model history storage 16. The parameter selector 12 may store all parameters into the model storage 14 and the model history storage 16 every time adjustment of the parameter is completed, or may store the parameter adjusted at an arbitrary time into the model storage 14 and the model history storage 16.

Figure 8:
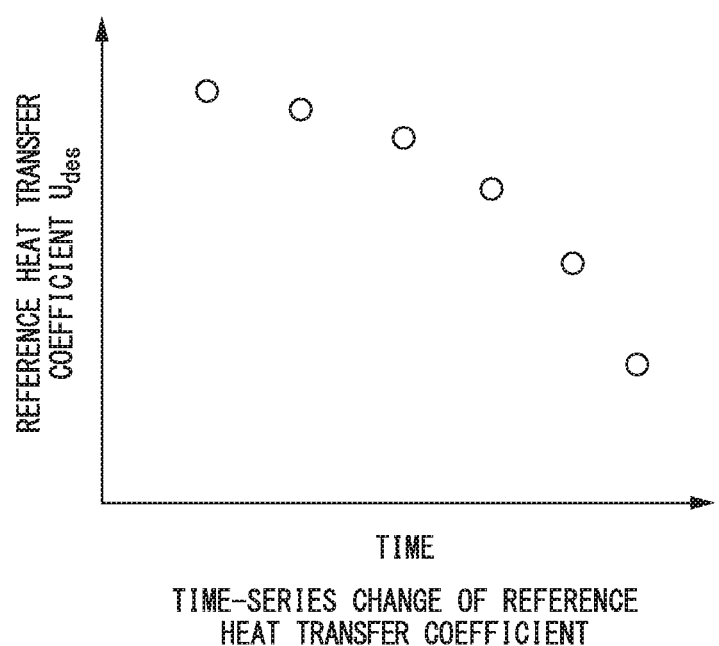
FIG. 8 is a diagram showing a time-series variation of the reference heat transfer coefficient of the heat exchanger according to one or more embodiments of the present invention.

Then, the diagnoser 18 reads the reference heat transfer coefficient $U_{des}$ and the conditions or time stamps at the time of adjustment of the parameter from the model history storage 16 and performs a diagnosis process (Step S413). For example, the diagnoser 18 generates time-series data of the reference heat transfer coefficient $U_{des}$ and inputs the generated time-series data into the display 20. FIG. 8 is a diagram showing a time-series variation of the reference heat transfer coefficient of the heat exchanger in one or more embodiments of the present invention. In FIG. 8, it can be seen that the value of the reference heat transfer coefficient $U_{des}$ decreases with time. An operator of the plant can confirm the state of the heat exchanger which is a facility to be diagnosed by checking the time-series data of the reference heat transfer coefficient $U_{des}$ displayed on the display 20. The routine of this flowchart ends as described above.

According to the above-mentioned embodiment, since only the reference heat transfer coefficient $U_{des}$ is adjusted after adjustment of the value of the proportional index α under the construction conditions of the heat exchanger has been completed, it is possible to accurately reflect the flow rate dependency in the parameters and to enhance accuracy of the model M which is used for simulation. As a result, it is possible to accurately diagnose performance deterioration of the heat exchanger or the like. When the flow rate of the heat exchanger is small, the reference heat transfer coefficient $U_{des}$ is not adjusted, that is, the adjustment is prevented. Thus, it is possible to prevent erroneous adjustment of the parameter.

The above-mentioned embodiment describes an example in which the parameter selector 12 selects the fixed parameter FP and the varying parameter VP, but the number of parameter classes may be increased and the selection process may be performed. For example, when the fixed parameter FP is adjusted annually such as at the time of periodic maintenance, a parameter varying with each season or product may be defined as a second fixed parameter.

The above-mentioned embodiment describes an example in which the tracking simulator 10 is used, but a simulator including both a static simulator and a dynamic simulator or a simulator including both a static simulator and a tracking simulator.

The static simulator performs simulation of a steady state of a device provided in a plant using a static model, for example, a model which models a steady state of a device provided in a plant. The dynamic simulator is performs simulation of a plant in consideration of a mutual relation between devices provided in the plant using a dynamic model, for example, a model which models a dynamic state (a non-steady state) of the plant in consideration of a mutual relation between the devices provided in the plant.

When the fixed parameter FP is adjusted by the tracking simulator 10, there are some cases where external conditions such as production outputs and raw materials of the plant PL are changed. When such factors are included in the adjusted parameter value, there are some cases where a current value of the fixed parameter FP and a previous value of the fixed parameter FP are not simply compared with each other. In the simulator including the static simulator and the dynamic simulator (or the static simulator and the tracking simulator), after a dynamic model which is used in the tracking simulator is changed to a static model and conditions are matched (operating conditions are equalized), the static model is returned to the dynamic model. By using this function, it is possible to reduce errors at the time of adjustment of the parameter due to the external conditions of the plant. Details of the simulator including the static simulator and the dynamic simulator (or the static simulator and the tracking simulator) are disclosed in Japanese Patent Application No. 2016-021116.

The above-mentioned embodiment describes an example in which the tracking simulator 10 is used, but an off-line type simulator that adjusts a parameter off-line may be used. The off-line type simulator may individually perform adjustment of the fixed parameter FP and adjustment of the varying parameter VP by performing control such that a parameter which has not been selected at the time of selecting a parameter is not changed.

While one or more embodiments of the present invention have been described above with reference to the accompanying drawings, the present invention is not limited to the embodiments. All shapes or combinations of elements described in the above-mentioned embodiments are merely examples, and can be modified in various forms on the basis of design requirements or the like without departing from the scope of the present invention.

What is claimed is:

1. A plant simulation device comprising:
   a first storage that stores a model that models a state of a facility in a plant, a first parameter that is adjusted at a start operation of the plant, and a second parameter that is varied during an operation of the plant, wherein the first parameter and the second parameter are set in the model; and
   a simulator that compares a process value of the facility with a simulated value calculated using the model and that adjusts the first parameter at the start operation of the plant,
   wherein the simulator further compares the process value of the facility with the simulated value calculated using the model that includes the adjusted first parameter and adjusts the second parameter during the operation of the plant.

2. The plant simulation device according to claim 1, further comprising:
   a diagnoser that diagnoses the facility using change information of at least one of the first parameter and the second parameter that are adjusted by the simulator.

3. The plant simulation device according to claim 1, wherein
   the simulator adjusts the first parameter and the second parameter to make a difference between the process value of the facility and the simulated value calculated using the model being equal to or less than a first threshold value.

4. The plant simulation device according to claim 1, wherein
   the simulator prevents the adjustment of the second parameter if an operating status of the facility does not satisfy adjustment conditions.

5. The plant simulation device according to claim 1, further comprising:
   a second storage that stores change information of the first parameter and the second parameter adjusted by the simulator, and operating conditions of the facility and time information at a time of adjustment.

6. The plant simulation device according to claim 1, wherein
   the facility is a heat exchanger, and
   the first parameter is a value indicating flow rate dependency of a heat transfer coefficient of the heat exchanger and the second parameter is a reference heat transfer coefficient at a reference flow rate of the heat exchanger.

7. The plant simulation device according to claim 2, wherein
   the facility is a heat exchanger,
   the first parameter is a value indicating flow rate dependency of a heat transfer coefficient of the heat exchanger and the second parameter is a reference heat transfer coefficient at a reference flow rate of the heat exchanger, and
   the diagnoser generates time-series data of the reference heat transfer coefficient and diagnoses the heat exchanger based on the generated time-series data.

8. The plant simulation device according to claim 6, wherein
the simulator prevents the adjustment of the reference heat transfer coefficient if the flow rate of the heat exchanger is less than a second threshold value.

9. A plant simulation method comprising:
comparing a simulated value calculated using a model that models a state of a facility in a plant with a process value of the facility, and adjusting a first parameter that is set in the model at a start operation of the plant; and
comparing the process value of the facility with the simulated value calculated using the model in which the adjusted first parameter is set, and adjusting a second parameter that is varied during an operation of the plant and is set in the model during the operation of the plant.

10. The plant simulation method according to claim 9, further comprising:
diagnosing the facility using change information of at least one of the first parameter and the second parameter that are adjusted.

11. The plant simulation method according to claim 9, wherein
the adjustment of the first parameter and the second parameter is performed to make a difference between the process value of the facility and the simulated value calculated using the model being equal to or less than a first threshold value.

12. The plant simulation method according to claim 9, wherein
the adjustment of the second parameter is prevented if an operating status of the facility does not satisfy adjustment conditions.

13. The plant simulation method according to claim 9, further comprising:
storing change information of the first parameter and the second parameter adjusted, and operating conditions of the facility and time information at a time of adjustment.

14. The plant simulation method according to claim 9, wherein
the facility is a heat exchanger, and
the first parameter is a value indicating flow rate dependency of a heat transfer coefficient of the heat exchanger and the second parameter is a reference heat transfer coefficient at a reference flow rate of the heat exchanger.

15. The plant simulation method according to claim 10, wherein
the facility is a heat exchanger,
the first parameter is a value indicating flow rate dependency of a heat transfer coefficient of the heat exchanger and the second parameter is a reference heat transfer coefficient at a reference flow rate of the heat exchanger,
the method further comprising generating time-series data of the reference heat transfer coefficient, and
the diagnosis of the heat exchanger is performed based on the generated time-series data.

16. The plant simulation method according to claim 14, wherein
the adjustment of the reference heat transfer coefficient is prevented if the flow rate of the heat exchanger is less than a second threshold value.

* * * * *